J. K. SHARPE, Jr.
PNEUMATIC STACKER.
APPLICATION FILED MAY 25, 1911.

1,124,539.

Patented Jan. 12, 1915.
2 SHEETS—SHEET 1.

Witnesses:
Adelaide Kearns
Clara Dilks.

Inventor
Joseph K. Sharpe, Jr.
By James A. Walsh,
Attorney

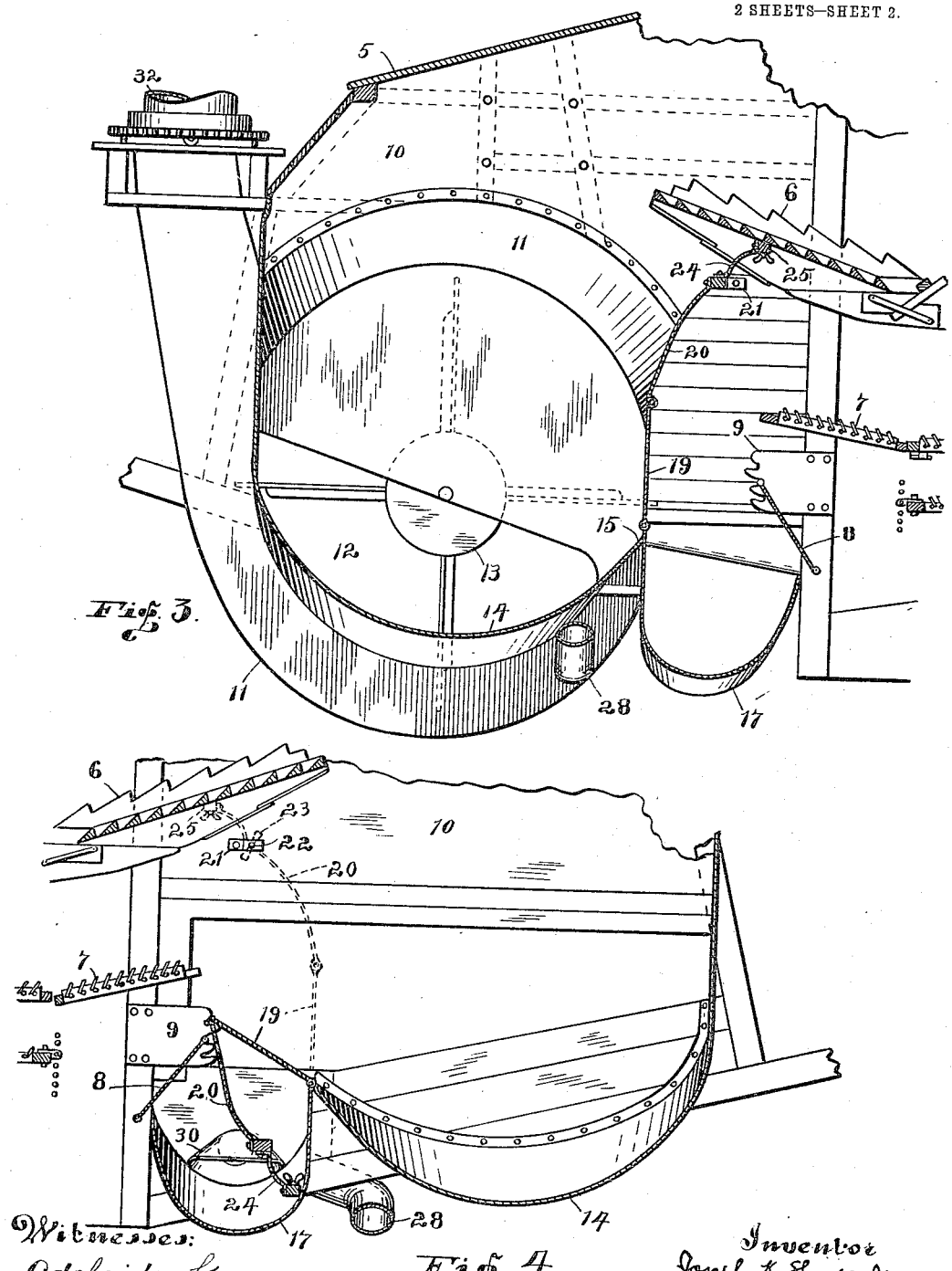

UNITED STATES PATENT OFFICE.

JOSEPH K. SHARPE, JR., OF INDIANAPOLIS, INDIANA, ASSIGNOR TO THE INDIANA MANUFACTURING COMPANY, OF INDIANAPOLIS, INDIANA, A CORPORATION OF INDIANA.

PNEUMATIC STACKER.

1,124,539. Specification of Letters Patent. Patented Jan. 12, 1915.

Application filed May 25, 1911. Serial No. 629,276.

*To all whom it may concern:*

Be it known that I, JOSEPH K. SHARPE, Jr., a citizen of the United States, residing at Indianapolis, in the county of Marion and State of Indiana, have invented certain new and useful Improvements in Pneumatic Stackers, of which the following is a specification.

The object of my invention is to provide a pneumatic stacker for threshing machines by which straw and chaff may together be discharged from such machine onto the same stack or pile, or where it is desired to preserve the chaff from the straw it may be discharged separately from the machine in a direction different to that taken by the straw, and which results I am enabled to attain by the employment of a single stacker fan with means associated therewith for conveying a portion of its blast through a chaff-receiving receptacle arranged adjacent the winnowing mechanism of the threshing machine, all as will be hereinafter more particularly pointed out.

Figure 1:
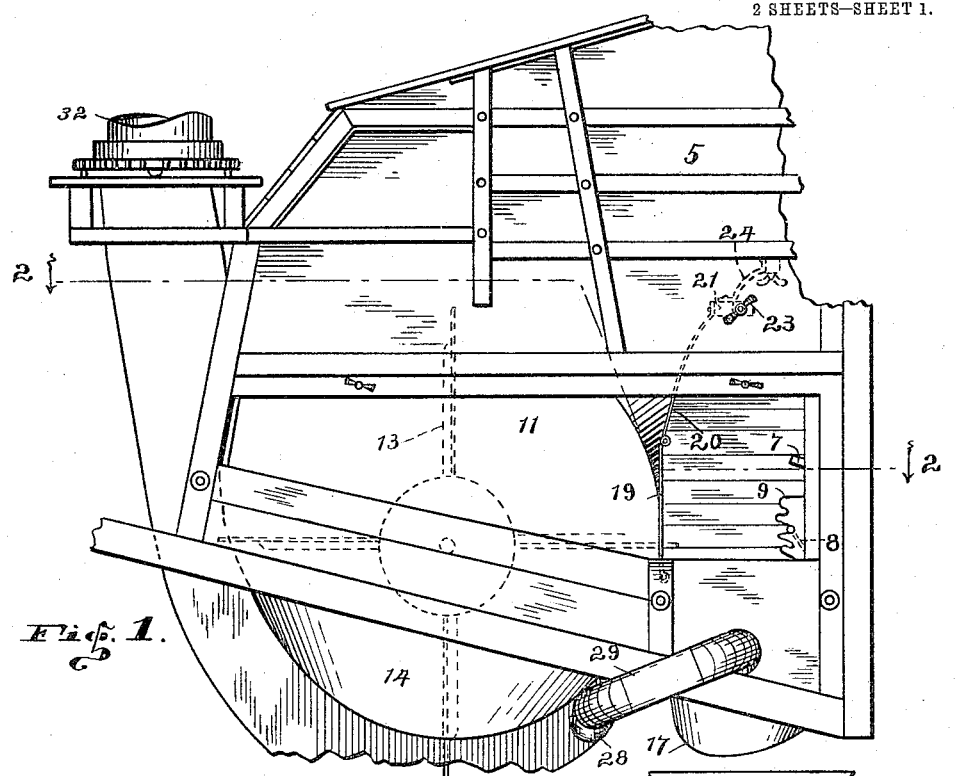
Figure 2:
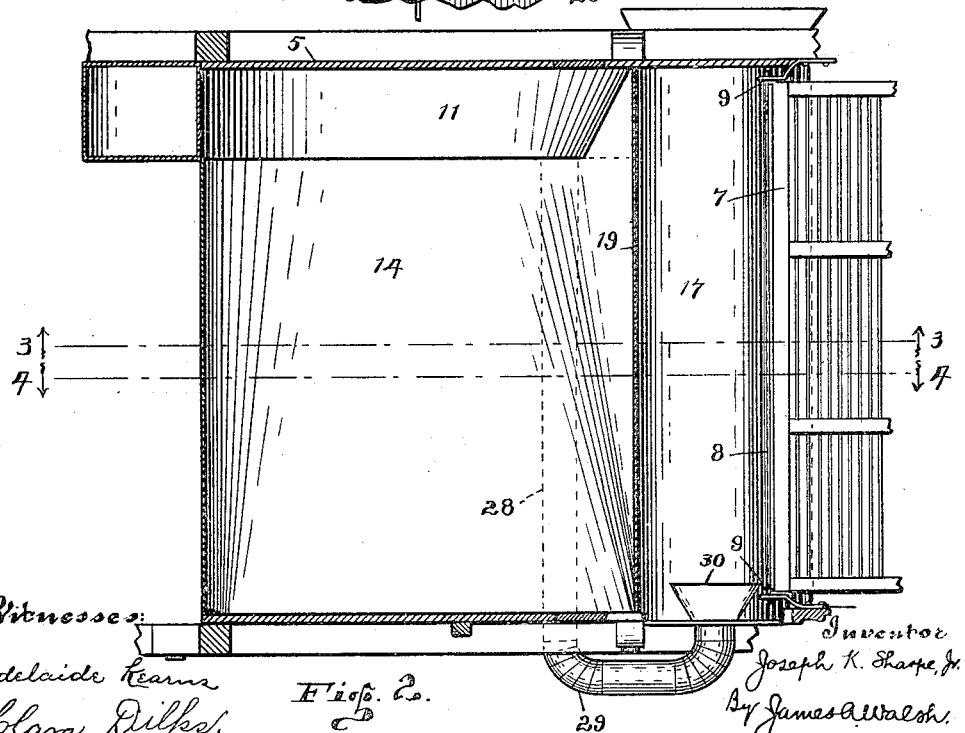

In the accompanying drawings, which form a part hereof, Figure 1 is a side elevation showing a threshing machine in fragment with my improved stacker attached thereto; Fig. 2 a plan taken on the dotted line 2—2 of Fig. 1; and Figs. 3 and 4 are longitudinal sectional views as seen when looking in the direction of the arrows from the dotted lines 3—3 and 4—4 respectively in Fig. 2. In said drawings the portions marked 5 indicate a threshing machine body of ordinary construction having the usual straw-rack, 6, and winnower, 7, therein, at the lower end of which winnower is an adjustable grain shield, 8, adapted to be held in various inclined positions by holders 9 at either side of the machine. To said threshing machine body 5 I attach my improved stacker, comprising the straw chamber, 10, a fan housing, 11, preferably at one side thereof and having a suitable inlet opening, 12, for the introduction of material to the fan, 13, therein, and a material-receiving hopper, 14, which may be inclined toward the fan, as indicated, or of any appropriate formation, the front wall, 15, of said hopper terminating at a height to admit flow of material from the winnower 7. Adjacent said hopper 15 I provide a transversely arranged chaff-hopper or receptacle, 17, which may be of inclined or other suitable form, and which is in position to receive material such as chaff from winnower 7. Extending upwardly from the juncture of said hoppers 15 and 17 is an adjustable baffle-plate comprising hinged members, 19, 20, the latter being secured to the side walls of the threshing machine body by any suitable means, such for instance as clips, 21, secured by bolts, 22, passing through said walls and held by nuts, 23. I also attach a flexible extension, 24, such as canvas, to said member 20, the end thereof being attached to the straw rack or otherwise in any appropriate manner, as at 25. To fan housing 11 a conduit, 28, is secured which extends to the opposite side of the machine, and is provided with a curved portion, 29, so that it may be introduced into said chaff hopper 17, a nozzle, 30, of any appropriate form being placed at the end thereof for distribution of an air blast, as indicated in Fig. 2.

In the operation of my improved stacker, when it is desired to discharge the straw and chaff together through the stacker chute 32, the upper portions of the baffle plate are released from their fastenings and folded down upon each other so that they will lie in chaff hopper 17, the lower member 19 thereof being brought to inclined position and held by the holder 9 or otherwise to act as an apron and span the space from said winnower 7 to said hopper 14, as shown most plainly in Fig. 4. When thus arranged the straw from rack 6 and chaff and fine particles from the winnowers flow into the hopper 14, and are together withdrawn by fan 13 and discharged through chute 32 in the usual manner. When the chaff is to be separated from the straw, the baffle-plate is unfolded and secured in the position indicated in Fig. 3, so that all the material discharging from the threshing machine below straw rack 6 is intercepted by said baffle and is deflected into chaff hopper 17 beneath, from whence it is constantly positively discharged from the end of said hopper at the opposite side of the machine from that where the conduit enters by the blast issuing from said nozzle 30, which blast is being created by the fan wings in housing 11 and expands laterally therefrom into and through said conduit, and during which operation the straw discharging from straw rack 6 is delivered into hopper 14 to be withdrawn and ejected by the stacker fan in the usual manner. By this means, as will be readily understood, I am enabled in a simple and efficient manner to discharge the straw and chaff separately in different directions from the threshing machine, by intercepting the chaff before it reaches the straw mass and subjecting the same to the action of an air blast substantially in the manner described by which it is ejected at one side of the threshing machine; and while I have illustrated and specifically described an appropriate form of baffle plate which I employ, I desire to be understood as not limiting myself to the use of such exact construction, as I may employ any suitable arrangement for the purpose which may be applied to the many types of threshing machines in use.

I claim as my invention:

1. A pneumatic stacker comprising a material-receiving chamber, a fan housing arranged at one side thereof, a hopper communicating with said fan, a chaff receptacle adjacent said hopper, a partition between said hopper and said receptacle for preventing material from entering said hopper and deflecting the same into said receptacle, and a conduit leading from said fan housing into said receptacle for discharging a blast from said fan through said receptacle and conveying material therefrom while material entering said hopper is being withdrawn and discharged by said fan separately from said chaff.

2. A pneumatic stacker comprising a material-receiving chamber, a fan associated therewith, a hopper communicating with said fan, a chaff receptacle adjacent said hopper, means between said hopper and receptacle for preventing chaff from entering said hopper, and a conduit leading from said fan to said receptacle for discharging a blast therethrough, whereby material entering said hopper and said receptacle may be simultaneously discharged in different directions and separate from each other.

3. The combination, with a pneumatic stacker comprising a fan and straw receiving hopper, of a chaff receptacle adjacent said hopper, adjustable means between said hopper and receptacle for preventing material from entering said hopper and deflecting the same into said receptacle, and means associated with said fan for receiving a blast therefrom and discharging the same through said receptacle for conveying material therefrom.

4. The combination, with a pneumatic stacker comprising a fan and straw receiving hopper, of a chaff receptacle adjacent said hopper, and a partition between said hopper and receptacle adapted to be adjusted in one direction to prevent material entering said hopper and in another direction to cover said receptacle to permit material to travel thereacross into said hopper.

In testimony whereof I affix my signature in presence of two witnesses.

JOSEPH K. SHARPE, Jr.

Witnesses:
C. E. SLOAN,
J. A. WALSH.

Copies of this patent may be obtained for five cents each, by addressing the "Commissioner of Patents Washington, D. C."